SECRECY SYSTEM

Original Filed April 18, 1955

3 Sheets-Sheet 1

INVENTOR.
PHIL H. WEISS
BY Lyon & Lyon
ATTORNEYS

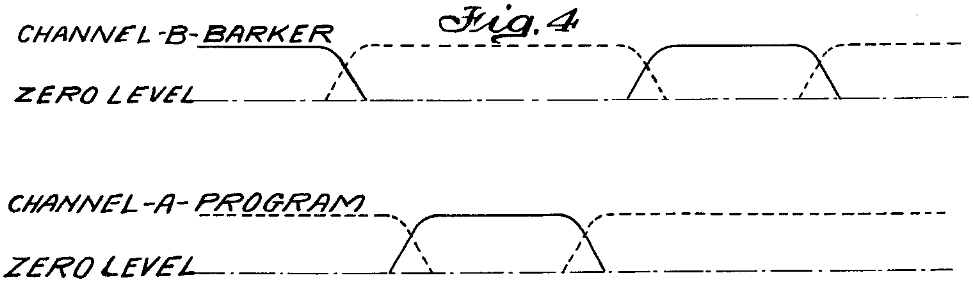
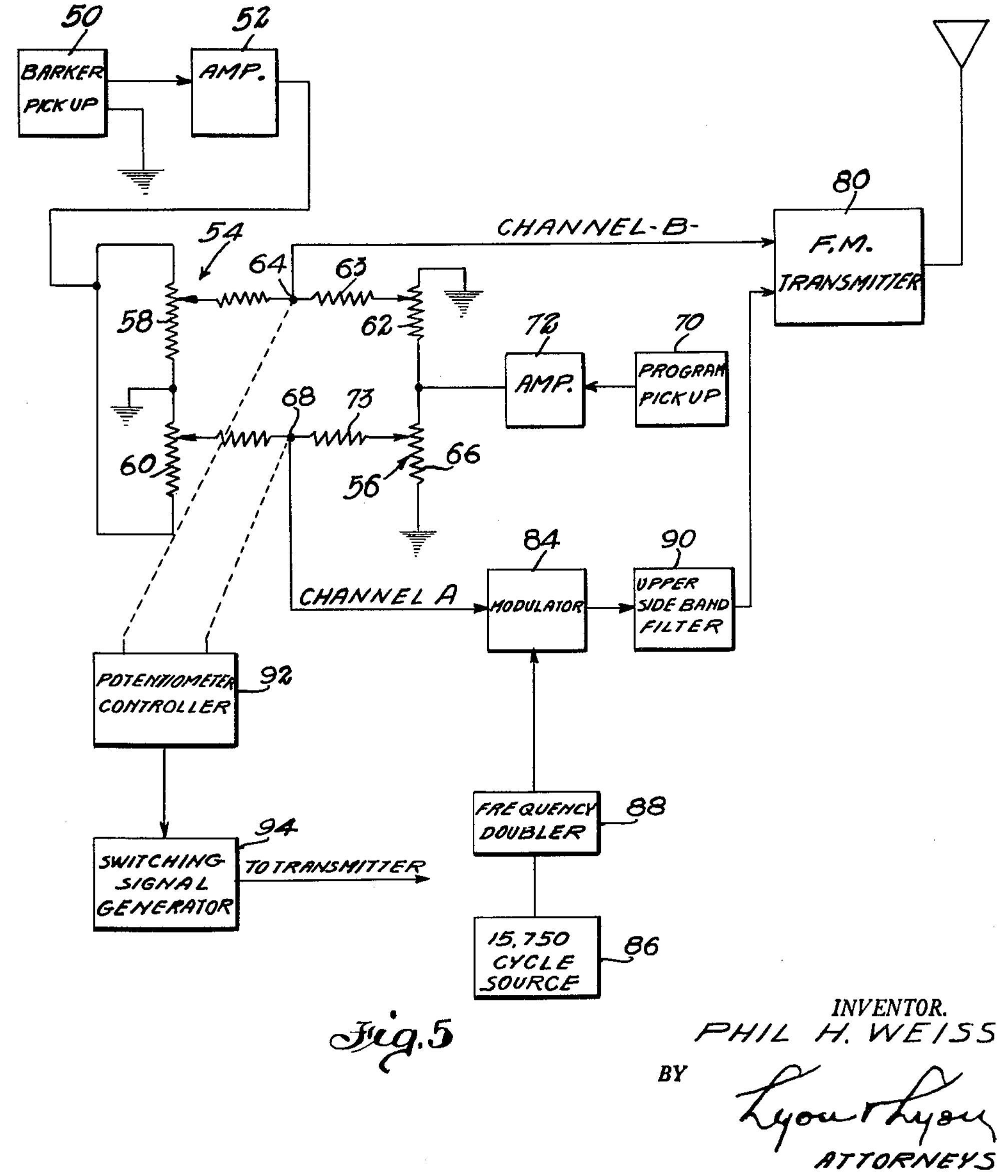
Fig. 5
INVENTOR.
PHIL H. WEISS
BY Lyon & Lyon
ATTORNEYS

INVENTOR.
PHIL H. WEISS
BY Lyon & Lyon
ATTORNEYS

United States Patent Office 3,054,857

Patented Sept. 18, 1962

3,054,857

SECRECY SYSTEM

Phil H. Weiss, Los Angeles, Calif., assignor to Paramount Pictures Corporation, New York, N.Y., a corporation of New York Original application Apr. 18, 1955, Ser. No. 501,840. Divided and this application Dec. 29, 1959, Ser. No. 862,604

2 Claims. (Cl. 179—1.5)

This invention relates to secrecy systems, and, more particularly, to an improvement in the type of secrecy system wherein information is transmitted randomly on more than one transmission channel.

This application is a divisional application and is divided out from United States patent application, Serial No. 501,840, filed April 18, 1955, for Secrecy System, by Phil H. Weiss.

Privacy systems are known wherein information is transmitted on one transmission channel for a random time, then switched to another channel for some random time, and then switched back to the first channel. A keying code is generated and transmitted which informs the receiver designated to provide intelligent signals upon receiving this information when to switch.

Information may be transmitted on one transmission channel, and, after some predetermined interval, switched to a second transmission channel, and, after being transmitted in the second channel for a time, it is again switched back to the first transmission channel. Although this type of switching is effective to render the information unintelligible to the receiver not equipped to follow the switching, it is still possible to detect the moment of switching so that an unauthorized receiver can follow the switching of the program and thus decode the transmission. Using presently known techniques, at the instant of switching between channels, there is a discontinuity and a transient is generated which can be detected and used as a decoding signal for keying an unauthorized receiver to follow the switching. Furthermore, when switching from one channel to another in the manner taught in the prior art, there is a disturbing audible click heard.

An object of this invention is to provide a system and method of preserving security in switching intelligence signals between two channels.

Another object of the present invention is to provide a novel system and apparatus for switching signals between two channels.

Still another object of the present invention is to provide a unique arrangement for switching between two channels wherein the switching transient is substantially eliminated.

The above and further objects of the present invention are achieved in a system whereby two transmission channels are employed for transmitting information. Transmission occurs on the first of the two channels for a predetermined period. At the end of that period, in the second transmission channel, the information signal is gradually increased from zero to a level substantially the same as that in the first transmission channel. The information content is maintained the same in both channels. While the simultaneous transmission occurs, the receiver may be switched from one channel to the other. A switching signal is generated at the transmitter to initiate this receiver action. The time of switching may occur at any time during the simultaneous transmission interval. For security purposes, either the switching from the first to the second channel may be made or the transmission may be retained on the first channel as desired after the simultaneous transmission. In either event, at the end of the simultaneous transmission interval, the information signal is gradually reduced to zero in the transmission channel not indicated by the switching signal to continue transmitting the program signal thereafter. In this manner, no transients are introduced by switching from one channel to the other, nor are there any discernible losses resulting at the receiver. A second information signal may be transmitted on the one of the channels on which the first piece of information is not being transmitted at that time. The reason for this is to insure complete security. If only one piece of information were transmitted, a receiver having broad-band reception which could receive both transmitting channels could intelligibly reproduce the program despite the switching. With two signals being received, however, this cannot happen. This second signal may be an intelligible signal or may be noise or other unintelligible signals, as desired. The second signal is gradually decreased to zero as the first signal is gradually increased from zero in the channel. In this manner, the fading of the second signal may also not be used for keying an unauthorized receiver.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 4 is a wave shape diagram showing the switching of signals in a subscription television system in accordance with this invention;

FIGURE 5 is a block diagram of a portion of a transmitter for a subscription television program arranged in accordance with this invention;

Figure 1:
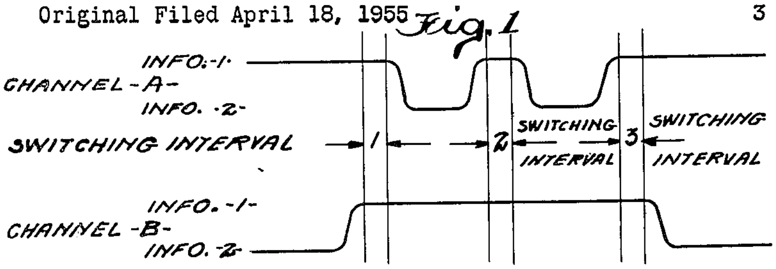
FIGURE 1 is a wave shape diagram showing the type of signals being transmitted on two transmission channels and the manner of interchange thereof, in accordance with the teaching of the present invention.

FIGURE 1 shows a wave-shape diagram which is provided to assist in understanding the invention. There are provided two communication channels, channel A and channel B. On channel A, information 1 is transmitted initially, and, on channel B, information 2 is transmitted initially. After some desired time, information 2 is gradually faded on channel B and information 1 is brought up. Thereafter, information 1 is transmitted for what may be termed a switching interval over both channels. At some random time during this interval, a switching signal may be generated. It is then coded and transmitted. Only receivers equipped to receive and decode this switching signal will be switched to receive information 1 from channel B. Thereafter, information 1 on channel A is faded to information 2. A receiver tuned to channel A will then get information 2. It will be appreciated that there will be a somewhat disjointed and meaningless reception as far as a receiver not equipped to follow the switching is concerned. The properly equipped receiver will continue to receive information 1 clearly and uninterruptedly. Information 2 may be short messages which it is desired should be heard by all the nonequipped receivers, may be gibberish, or may be noise. Of importance, however, is the fact that the manner of switching with information 1 from channel A to channel B is one which is random and, also, which minimizes the occurrence of discontinuities during the switching interval by means of which a receiver not equipped or not authorized to receive information 1 could heretofore have followed it. The switching signal may be readily disguised or hidden in false switching signals which are continuously transmitted.

At a later time information 2 on channel A may be faded to information 1. However, in order to further assist in maintaining privacy for information 1, although a second switching interval is established, no switching is done. Switching of information 1 from channel B to channel A is actually effectuated during a third switching interval. After this third switching interval, information 2 is transmitted on channel B and information 1 on channel A, as before. This type of switching occurs at a sufficiently high frequency so that the portions of information 1 which may be received by a receiver tuned to either channel A or channel B are insufficient to convey any intelligence.

Figure 2:
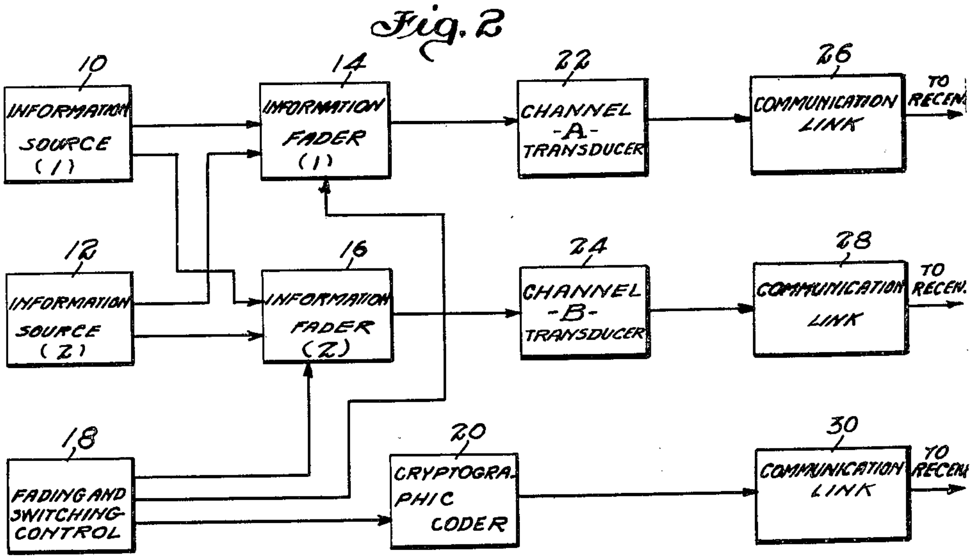
FIGURE 2 is a block diagram of a portion of a transmitter arranged in accordance with this invention.

FIGURE 2 is a generalized block diagram of an embodiment of the invention. There is represented an information 1 source 10 and an information 2 source 12. Each of these is connected to a first information fader 14 and a second information fader 16. Faders are well known in the radio and television transmitting fields, being used extensively to fade from one program to another or from music to speech. Here they are used to fade from information 1 to information 2, or vice versa. Each information fader is controlled by a fader control 18. This determines their sequence of operation and, therefore, as explained previously in connection with FIGURE 1, determines the order of the transmission of information 1 and information 2 over channel A and channel B. From the fader control 18, there is also generated a switching signal during the switching interval, which indicates to a properly equipped receiver that it should switch from channel A to channel B, or vice versa. This signal is applied to a cryptographic coder 20, which serves the function of coding the switching or keying signal so that it will not be detected, except by a properly equipped receiver.

The first and second information faders 14, 16 are respectively connected to two transducers which take the respective outputs and transform them by modulation, or any other preferred method, for transmission on channel A and channel B, respectively. Channel A transducer output, channel B transducer output, and the cryptographic coder output are then all applied to the respective communication links 26, 28, 30 to the receiver. These communication links may be separate transmitting antennas, closed wire connections, or parts of the same channel of a broadcast. The operation of the system shown in FIGURE 2 is in accordance with the description of FIGURE 1. The information faders are controlled by the fader and switching control to permit information 1 and information 2 to be transmitted on channel A and channel B, respectively—to permit information 1 to be transmitted on both channels—to generate a switching signal during the switching interval occurring at this time and to subsequently enable transmission of information 1 on channel B and information 2 on channel A, as was described for FIGURE 1.

Figure 3:
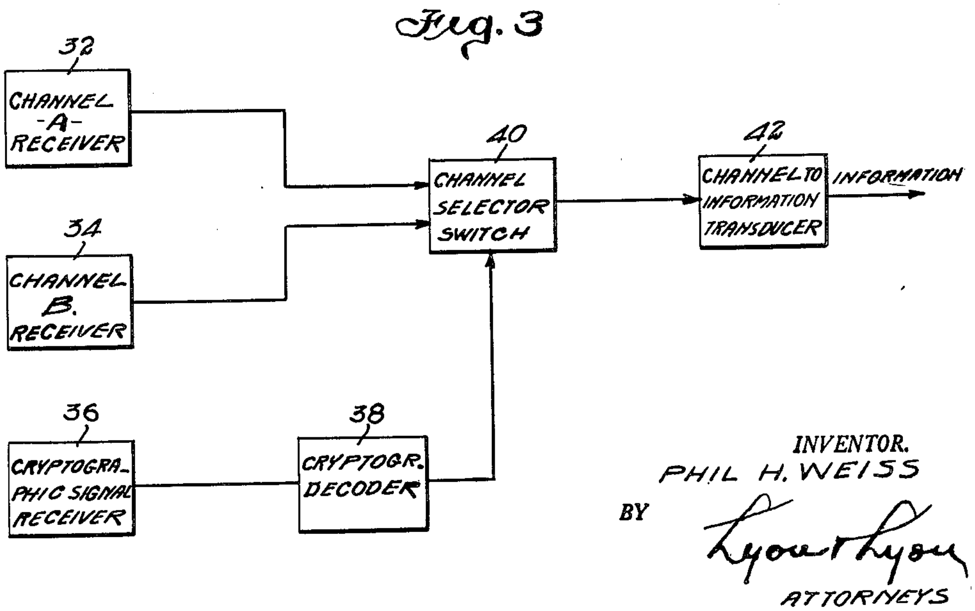
FIGURE 3 is a block diagram of a portion of a receiver arranged in accordance with this invention.

FIGURE 3 is a generalized schematic of a receiver in accordance with this invention. It includes a channel A receiver 32, channel B receiver 34, and cryptographic signal decoder 36, each of which receives the indicated signals from the transmitter shown in FIGURE 1. The cryptographic signal receiver applies its output to a cryptographic decoder 38 which serves to determine the presence of the keying or switching signals and applies these to a channel selector switch 40. This switch is controlled to select either channel A or channel B from the respective receivers in accordance with the signal received from the crytographic decoder. The output is applied to channel-to-information transducer 42. This may be any suitable demodulator arrangement. The channel A, channel B, and cryptographic receivers may be the radio-frequency portion of a single receiver with filters for separating them from one another or they may be three separate radio-frequency sections.

To more specifically illustrate the invention, it will be explained as being employed in a subscription television system. It will be understood, however, that this is not to be considered as a limitation upon the invention, since this method and system of preserving secrecy may be employed elsewhere other than in a subscription television system. A subscription television system is one wherein a coded or scrambled television program is transmitted. Receivers are equipped with apparatus to receive and decode the scrambled program. However, it is required that the owner of the receiver pay for the program. To achieve this, each receiver is equipped with a coin box which is made responsive to information transmitted prior to transmitting the program. This information, amongst other things, establishes a coin demand at the coin box. Upon payment of such coin demand by depositing coins in the coin box, the decoding apparatus is enabled so that when the program is transmitted, it is rendered intelligible at the receiver. One such subscription television system is described and claimed in an application by David L. Loew et al. for Prepaid Entertainment Distribution System, filed January 19, 1950, and assigned to a common assignee. The system described in that application scrambles the video signals being transmitted. It is proposed to also separately scramble the audio portion of a subscription television program being transmitted to further insure secrecy of such transmission, and that it will not be decoded by nonsubscribers.

As shown by the wave shapes in FIGURE 4, over a first channel, or channel A, there is initially transmitted program-representative signals, while over a second channel, or channel B, there is initially transmitted barker-representative signals. Channel B also corresponds to a channel in a receiver of a nonsubscriber or to the channel in a subscriber receiver which is normally in condition to receive signals being transmitted without any payment for a program. The barker is transmitted initially on channel B. The barker comprises audio signals which describe the quality of the program and the price of the program and other information calculated to interest the individuals listening to same, so that they will deposit the price of the program in the coin box attached to their television set in time to receive the program. The barker may also be used to announce the time of the program to be transmitted.

At the designated time, program signals are transmitted on channel A. After a predetermined interval, the barker signals in channel B are reduced gradually in amplitude until a zero level is attained. Meanwhile, the program signals are gradually increased in amplitude in channel B from zero to the same level as they are being transmitted in channel A. It is to be noted that the reduction in the barker signal level and the increase in the program signal level are made to occur very gradually, in order not to introduce any transients. The time for fading out and in may be made as long or short as desired. A period is preferred which is on the order of one-tenth of a second. For a period of time thereafter, the program signals are simultaneously transmitted on both channels. The phase and levels of the signals at the receiver should preferably be substantially the same, so that when switching from one channel to the other occurs at the receiver, there is no detectable difference to annoy the listener. At any time during the period of simultaneous transmission, the transmitter may generate and transmit a signal to a receiver, which signal informs the receiver that it should switch from channel A to channel B. Thereafter, the program on channel A is gradually reduced to zero level and the barker is brought up to full level.

If desired, instead of barker a noise signal or other intelligence signal may gradually be introduced in channel A and transmitted for a period of time. Channel B continues to transmit a program for some suitable interval. The signal on channel A may then be reduced to zero level again, while program signals are gradually brought up to the level and phase of channel B. Again, during the period or interval of simultaneous transmission, the receiver may be informed by a switching code that it should switch reception from channel B back to channel A. After this has occurred, the program signal on channel B is gradually reduced to zero and other barker signals may gradually be introduced and brought up to the desired transmission level. The periods of nonsimultaneous transmission, during which barker signals may be transmitted, may be selected by the program director in a manner so that a complete barker announcement is made prior to barker being cut off. In order to further deceive any unauthorized receiver trying to follow the switching, instead of a switching of channels occurring during the simultaneous program transmission, the program may thereafter be transmitted on the same channel as it was previous to the simultaneous transmission.

The method of switching signals described eliminates any transients which may be seized upon to inform a nonsubscribing receiver that the switching occurs. Furthermore, the subscriber receiver does not receive any disturbing noises at the time of switching. In the prior-art systems, the switching between channels would occur by discontinuing transmission on chanel A and immediately thereafter, or at some suitable interval, continuing the transmission on channel B. Such a system may be readily followed.

Referring to FIGURE 5, there is shown a block diagram of a transmission system in accordance with this invention. There is shown only that portion of a television transmitter which is required for an understanding of this invention. The remainder of the television transmitter is well known and, accordingly, need not be described herein. The rectangle designated as barker pickup 50 comprises the usual microphone and preamplifier apparatus or a recorder which has recorded barker signals. The barker pickup is followed by an amplifier 52. The output of the amplifier is applied across the resistors 58, 60 of two potentiometers 54, 56. Potentiometer 54 may consist of the type wherein there are two potentiometer resistors 58, 62 and a slider arm 64 for each, which may be moved to simultaneously vary the voltage takeoff point along resistors 58, 62. Potentiometer 56 is similarly constructed and also has the resistor 66 and a variable arm 68, which is moved to simultaneously vary the voltage takeoff point along resistors 60 and 66. Isolation resistors 63, 73 are connected into the potentiometer arms to isolate barker and program signals. Potentiometers 54 and 56 will be recognized as representative of cross faders, which are employed in radio and television broadcasting studios to fade from one signal source to another. Their electronic equivalents are also well known.

A program pickup 70 comprises the usual microphone and preamplifier and has its output applied to an amplifier 72. The amplifier output is applied across the resistor 66 of potentiometer 56 and also across resistor 62 of potentiometer 54. The slider arm 64 is connected into what may be designated as channel B of the system and, as shown in the diagram, is connected to a rectangle 80, designated as the FM transmitter. Channel B is the usual audio transmission system of a television transmitter. This channel, prior to modulation on the carrier, covers the frequency range from zero up to 15 kc. The second potentiometer slider 68 is connected to a modulator 84, which modulates the audio signals upon a carrier. This carrier is obtained by doubling the horizontal-line-rate signal. The line-rate signals may be obtained from the 15,750-cycle generator 86 used to supply horizontal line sync signals. This frequency is doubled by a frequency doubler 88, and then the signals from the potentiometer are used to modulate these signals. An upper sideband rejection filter 90 removes the upper sideband so that the output signals comprise the lower sideband and range in frequency from 16½ to 31½ kc. Both channel A and channel B are then modulated and transmitted in the usual way by the FM transmitter of the television transmitter.

The fading operations performed by potentiometers 54, 56 may be automatically controlled by a controller 92. It will be appreciated that as the potentiometer slider 64 is gradually moved from the top to the bottom of the resistors 58 and 62, the barker signal is gradually reduced to a zero level. This also serves to increase the program signal from a zero level to that desired in the channel. There is effectively an operation whereby the barker signal is decreased and the program signal is increased in a manner so that the over-all program level remains substantially constant. Thus, it is extremely difficult to determine when this shifting operation occurs. The program signal is then transmitted simultaneously on both channels. At some time during the simultaneous transmission, a signal is generated by a switching signal generator 94. This signal has the function of informing the receivers that a switch should be made to the channel which is to thereafter transmit a program. The selection of the time for such switch is made at some random interval during the simultaneous program transmission on both channels. This signal is transmitted in a manner so that it cannot be used by unauthorized receivers. This signal may be coded and this code transmitted in any number of different ways. One of these is as time-modulated pulses during the horizontal sync pulse interval in the manner described in the patent by Young, No. 2,401,384. Alternatively, it may be desirable to transmit this switching information as a coded pulse train in a manner described in the above-noted application for Prepaid Entertainment Distribution System, by David L. Loew et al.

It will be appreciated that the potentiometer 56 may be operated in a manner similar to that described for potentiometer 54, to reduce the program signal and to increase the barker signal, or the reverse thereof. Therefore, in operation, both potentiometers are brought up to the point where program is transmitted on one channel and barker on the other. Then one of the potentiometers is varied to bring the barker to zero and bring up the program level on that channel. Following this, the switching signal is generated and the potentiometer in the channel which is not to thereafter transmit program is moved to bring the program signal to zero and bring up the level of the barker or other signal.

Figures 6, 7:
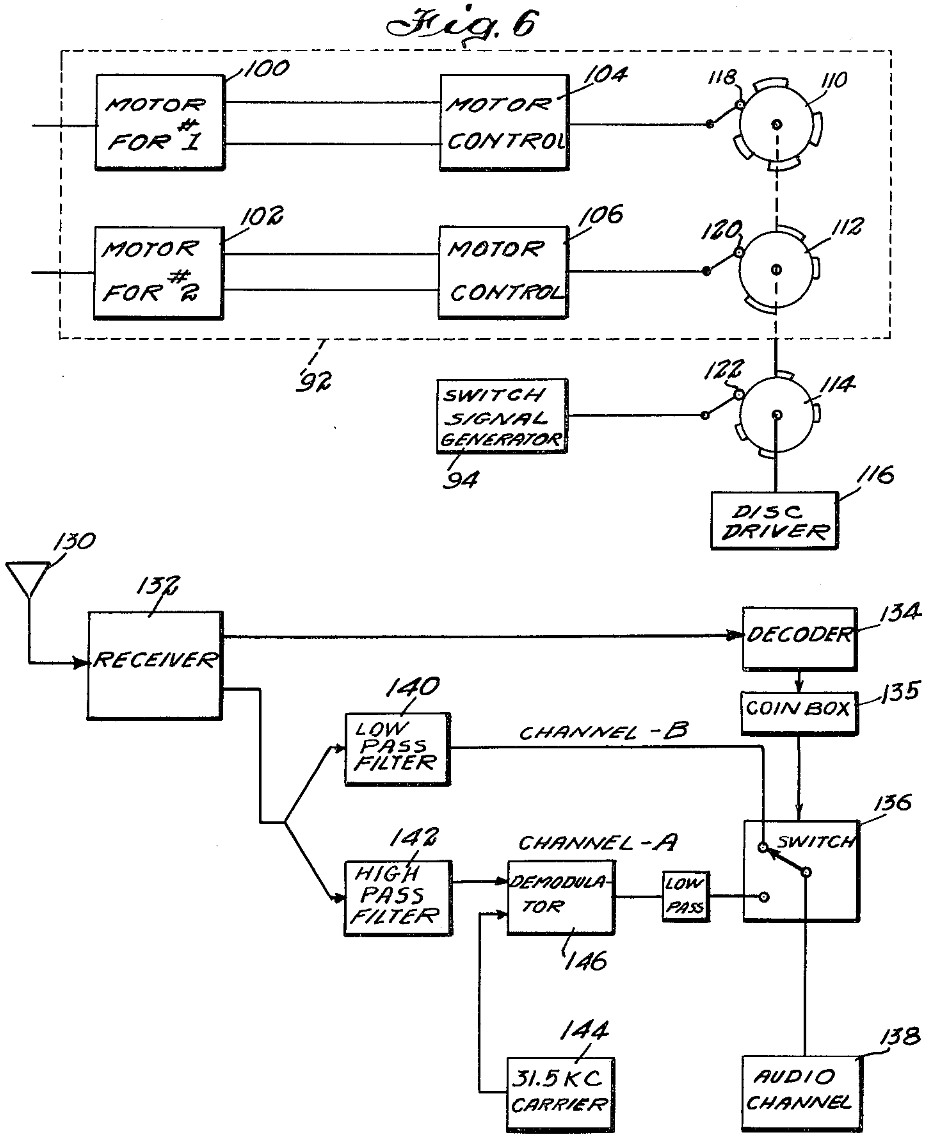
FIGURE 6 is a block diagram of one type of switching control system at the transmitter in accordance with this invention.
FIGURE 7 is a block diagram of a portion of a receiver showing the manner of decoding the program transmitted in a subscription television system in accordance with this invention.

Referring now to FIGURE 6, there is shown a block diagram of a system for switching the potentiometers and generating switching signals. A first motor 100 is used to drive potentiometer 54. A second motor 102 is used to drive potentiometer 56. A motor control 104 controls the direction of rotation of motor 100 as well as the amount of such rotation. A second motor control 106 performs the same function in combination with motor 102. Three cam discs 110, 112, 114 are ganged on a common drive shaft which is driven by a disc driver. Disc driver 116 is operated at a variable speed in order not to have switching between channels occur at the same relative intervals. Discs 110 and 112 have raised portions on their peripheries which are sensed by roller switches 118 and 120. These roller switches operate the motor controls 104, 106 so that the motors 100, 102 drive the potentiometers 54, 56 in a desired manner to effectuate coding of the program signals being transmitted. When the roller switch 118 is lifted as a result of sensing an elevation on the surface of disc 110, it results in potentiometer 54 being driven to a position whereby channel A is receiving program and no barker.

When roller switch 120 is lifted by sensing an elevation on disc 112, it results in potentiometer 56 being driven to a position whereby channel B receives barker and no program. When the roller switches are respectively on the lower or unraised portions of the disc periphery, the reverse conditions to those described are provided.

During the intervals when program is being transmitted on both channels, disc 114 has an elevation thereon which actuates roller switch 122, which, in turn, enables the switch-signal generator 94. This operates in the manner recited in the description for FIGURE 5 to generate a switching signal which is coded and then transmitted. The switch-signal generator may be, for example, a cyclic counter, only certain counts of which are selected as the switch code. The program for switching may be readily altered by altering the cam disc surfaces. The arrangement shown in FIGURE 6 is merely an example of one method for accomplishing the desired result mechanically. The scheme may be accomplished electronically in a manner well known to the art by employing randomly excited counters whose outputs upon achieving desired combinations effectuate operation of the potentiometer motors for the purpose of switching.

Reference is now made to FIGURE 7 wherein is shown a block diagram of a receiver which can decode the information transmitted from the transmitter represented by FIGURE 5. This receiver includes the usual receiving antenna 130 and a front end of the receiver 132, which includes the FM detector portion of the system used to demodulate the FM sound transmission. A decoder 134 decodes the switching signals so that switch 136, which is preferably an electronic switch, may be instructed to connect to either channel A or channel B for the purpose of uninterrupted reception of program. The output of the switch is applied to the usual television receiver audio channel 138. In a subscription television receiver, there may be inserted between the decoder and the switch a coinbox 135. This coinbox can be an arrangement such as is described in the previously noted application to Loew et al. In such coinbox, upon deposit of the required amount for a program, the data for which is transmitted, a switch is operated. This switch may be a double-pole, double-throw switch, or its electronic equivalent. This switch, when not operated, connects signals from the decoder to the switch 136 with a polarity to move switch 136 between channel A and channel B to receive only the barker signals. When the cost of the program is deposited in the coinbox, the double-pole, double-throw switch is operated to apply the decoder switching signals in a polarity to cause switch 136 to follow the program as it is switched between channel A and channel B. A nonsubscriber receiver will hear the sound on channel B consisting of repeated barker announcements interspersed with fragments of program. The coinbox may alternatively have an arrangement whereby it does not connect any signals from the decoder to the switch until the required coin payment has been made. In this event, the receiver will provide intelligible barker interspersed with discontinuous bits of program until payment, when only program is received. The signals detected by the FM portion of the receiver are applied to a low-pass filter 140 and a high-pass filter 142. The low-pass filter will pass signals up to 15 kc. while the high-pass filter will pass signals between 16½ and 31½ kc. The output of the low-pass filter may be directly applied to the audio channel, since these are the audio signals themselves. The output of the high-pass filter 142, however, consists of audio signals which are modulated on the lower sideband of a subcarrier of a frequency which is twice the horizontal line rate. Accordingly, carrier must be supplied for demodulation. This is obtained from source 144, which supplies 31.5 kc. to the demodulator 146, which then demodulates the audio portion of the modulated signals so that the resultant audio signals may be applied to the audio channel.

In accordance with the above-described method and system, security of the program sound is achieved by switching its location between two channels at randomly chosen times and in accordance with a schedule determined by the potentiometer-controlling apparatus.

In a system which was built and operated in accordance with the description herein, when the switching was done approximately every second, the intelligibility and utility of program sound was very low, despite the fact that it was received about half the time by a receiver equipped to receive on only one channel. By shortening the interval between switchings, the unintelligibility of the program was rendered substantially complete as far as a receiver not equipped to decode the transmission is concerned. Detection of the switching was not achievable except with proper decoding of the switching signals. The transition between the program signals and barker signals was made slowly, in order that no detectable, unusual frequency components were generated, such as are unavoidably introduced if abrupt switching is used. The fact that a program is simultaneously present on two channels can be detected by unauthorized receiver as a clue to switch to the other channel except that frequently, even though program is present on both channels, a switching operation is not made.

Accordingly, there has been shown and described above a novel, useful system and method for preserving security of transmission over two transmission channels.

I claim:

1. The method of preserving security for one of two intelligence signals being transmitted in a system employing a first and a second transmission channel, comprising transmitting said one of said two intelligence signals over said first channel, transmitting said other of said two intelligence signals over said second channel, gradually decreasing the level of transmission of said other intelligence signal to zero, transmitting said one intelligence signal over said second channel with a level substantially equal to its transmission over said first channel, gradually decreasing the level of transmission of said one intelligence signal over one of said transmission channels, and transmitting said other intelligence signal over said one of said two transmission channels.

2. In a system for transmitting two different intelligence signals, employing first and second transmission channels, to receivers having two corresponding receiving channels the method of securing reception of one of said two intelligence signals comprising transmitting said one of said two intelligence signals over said first channel, transmitting said other of said two intelligence signals over said second channel, gradually reducing to zero the level of transmission of said other intelligence signal, while gradually increasing the level of transmission of said one intelligence signal in said second channel to equal the level of transmission in said first channel, generating a signal at a random time within the interval of transmission of said one intelligence signal by both channels to indicate which one of said two channels will continue to transmit said one intelligence signal, transmitting said generated signal to said receivers, and gradually reducing to zero the level of transmission of said one signal in the channel not indicated by said generated signal, while gradually increasing the level of transmission of said other intelligence signal in said channel not indicated by said other generated signal.

No references cited.